United States Patent
Knöpfle et al.

(10) Patent No.: US 7,802,487 B2
(45) Date of Patent: Sep. 28, 2010

(54) GEAR AND VEHICLE SEAT COMPRISING SUCH A GEAR

(75) Inventors: Urban Knöpfle, Titisee-Neustadt (DE); Wolfram Hofschulte, Bonndorf (DE)

(73) Assignee: IMS Gear GmbH, Eisenbach (DE)

( * ) Notice: Subject to any disclaimer, the term of this patent is extended or adjusted under 35 U.S.C. 154(b) by 0 days.

(21) Appl. No.: 11/638,547

(22) Filed: Dec. 14, 2006

(65) Prior Publication Data

US 2007/0157752 A1    Jul. 12, 2007

(30) Foreign Application Priority Data

Dec. 16, 2005   (DE)   ........................ 10 2005 060 799

(51) Int. Cl.
*F16H 21/00*   (2006.01)

(52) U.S. Cl. .............. 74/89.14; 297/344.2; 297/344.11; 74/89.23

(58) Field of Classification Search ................ 297/330, 297/344.11, 344.2; 74/89.23, 89.14, 606 R
See application file for complete search history.

(56) References Cited

U.S. PATENT DOCUMENTS

| | | | |
|---|---|---|---|
| 4,802,374 A * | 2/1989 | Hamelin et al. ............ | 74/89.14 |
| 6,322,146 B1 * | 11/2001 | Fisher, Jr. .............. | 297/362.14 |
| 6,915,998 B2 * | 7/2005 | Borbe et al. ................ | 248/429 |
| 7,198,243 B2 * | 4/2007 | Hofschulte et al. .......... | 248/429 |
| 7,556,234 B2 * | 7/2009 | Ito et al. ...................... | 248/429 |
| 7,571,666 B2 * | 8/2009 | Borbe et al. .............. | 74/606 R |
| 7,703,347 B2 * | 4/2010 | Porinsky et al. ............... | 74/441 |
| 7,712,391 B2 * | 5/2010 | Hofschulte et al. ........... | 74/425 |
| 2006/0060015 A1 * | 3/2006 | Hofschulte et al. ......... | 74/89.23 |
| 2006/0170266 A1 * | 8/2006 | Landskron et al. ..... | 297/344.11 |
| 2010/0013284 A1 * | 1/2010 | Koga et al. ............... | 297/344.1 |

FOREIGN PATENT DOCUMENTS

DE    102 30 514 A1    1/2004

* cited by examiner

*Primary Examiner*—Joseph F Edell
(74) *Attorney, Agent, or Firm*—The Nath Law Group; Jerald L. Meyer; Robert T. Burns

(57) ABSTRACT

The invention relates to a gear for adjusting two parts (60, 61) that can be displaced in relation to each other, particularly vehicle parts of a seat adjustment device, of a window lifter or of a sliding roof, wherein the first one of the parts (60) comprises a non-rotatable spindle (62) or a fixed toothed rack. The gear comprises a worm wheel (4, 41), with a spindle nut (42) non-rotatable thereto for driving the spindle (62) or a worm non-rotatable thereto for driving the toothed rack, a drivable worm (3, 31) for transmitting a driving force to the worm wheel (4, 41) and a gear housing (1), which accommodates and supports the worm (3) and the worm wheel (4) and which can be non-rotatably connected to the second one of the parts (61) in the displacement direction thereof, the gear housing (1) being formed by a single-piece body with a worm bearing (14) and a worm wheel bearing (19).

13 Claims, 3 Drawing Sheets

GEAR AND VEHICLE SEAT COMPRISING SUCH A GEAR

The present inventive subject matter relates to a gear for adjusting a vehicle seat and further relates to a vehicle seat having such a gear.

BACKGROUND

EP 0 979 750 A2 describes a vehicle seat comprising an adjusting device with a spindle and an associated spindle nut. The spindle is fixed to a first adjustment element of the adjusting device. The spindle nut can turn in a second adjusting element, wherein the second adjusting element together with the first adjusting element is mounted in sort of a rail guide. With its outer casing, the spindle nut forms a worm wheel, which is engaged with a worm of a drive unit. The arrangement serves the displacement of a vehicle seat attached to the second adjusting element in relation to the first adjusting element, which is fixed to the vehicle bottom. The disadvantage associated with this arrangement is that it comprises a plurality of individual components, which must be disposed and attached directly in the rail arrangement formed by the two adjusting elements. Any potentially necessary repairs are therefore associated with great expenses.

U.S. Pat. No. 4,802,374 describes a control drive for a vehicle seat, wherein such a spindle is non-rotatably connected to a vehicle seat rail forming an adjusting element. The spindle, however, is fastened outside the rail guide, which is considered undesirable by vehicle manufacturers. A further seat adjustment device with a self-locking adjusting drive for vehicle seats is known from DE 1 755 740. Also in this arrangement, a plurality of components is disposed adjacent to a rail guide.

A gear arrangement with complex design for adjusting a vehicle seat is known from WO 02/070299 A1. This arrangement has a gear with complex design, which gear is intended to accommodate forces occurring in the event of an accident.

EP 1 068 093 B1 discloses a gear, as that illustrated according to FIG. 3, which is used to adjust two elements 60, 61 in relation to each other, particularly vehicle elements of a seat adjustment device, a window lifter or a sliding roof, wherein the first of the parts 60 forms a lower rail firmly connected to the vehicle bottom, which rail receives a locked spindle 62 or a fixed toothed rack. The gear 6 is located on the spindle 62 and displaced back and forth along the spindle 62 upon actuation. The gear 6 is received in a mount 63, which is displaced back and forth together with the second of the adjustable elements 61. The mount 63 is fixed to the second of the elements 61 adjustable in relation to each other, which second element forms a top rail that is adjustably connected to the bottom rail. The upper rail is connected to further components of the vehicle seat via a retaining plate 64. Furthermore, a drive mechanism 66 is attached to the retaining plate 64 using fastening elements 65, the drive shaft 67 of which mechanism is connected to a drivable worm of the gear 6.

The gear 6 comprises a worm wheel, with a spindle nut locked thereto for driving the spindle or a worm locked thereto for driving the toothed rack, a drivable worm for transmitting a driving force from the drive mechanism to the worm wheel and a gear housing, which receives and supports the worm and the worm wheel and is connected non-displaceably to the second of the adjustable elements 61 in the displacement direction. The gear housing comprises a plurality of, but at least two, housing plates that are fixed against each other with plug-type connectors. The plug-type connectors fix the positions of the housing plates in relation to each other in all three-dimensional directions, wherein the plug-type connectors are configured at the same time as supporting connecting joints, which absorb the gear forces. If only two housing plates are provided, the gear housing comprises two L-shaped housing plates. If at least four elements are provided, the gear housing comprises at least two pairs of mutually opposed disk-shaped housing plates, wherein in any case a complex gear arrangement is provided, which in addition to the housing elements necessitates a plurality of further bearing elements or bearing support elements, such as washers. Apart from the complex assembly of a plurality of individual components, it is also disadvantageous that the tolerances of the individual components must be adapted to each other. The individual housing elements of such a gear housing are connected by welding.

Furthermore it has been known to provide two individual pressure housing elements, which are equipped with a spindle nut, driver plates and bearing bushings as well as a worm and associated bearing bushings and are then closed through plastic deformation of plug-type connectors of the housing halves.

DE 36 40 197 A1 describes a drive apparatus for an adjustable power seat with a two-piece housing. In two opposed walls of the housing, respectively, a bore is formed for accommodating the shaft of a worm or of a worm wheel. So as to be able to support the shaft projecting from one end of the worm, a cover is inserted in front of the bore, which cover on the inside comprises a plug for supporting the shaft. In terms of the support of the worm wheel and the wheel, this concept has a two-piece housing, which is formed by a main housing and the absolutely required cover in terms of its function.

EP 0 992 711 A2 describes a gearbox for receiving a worm and a worm wheel, through each of which a shaft extends. The two shafts are mounted in two opposing recesses, wherein the recesses are formed by corresponding through-bores through the opposite side walls. So as to insert the worm wheel and worm in the housing, the housing comprises two members, wherein the respective parting line through the side walls extends at the center through the through-bores. After inserting the shafts of the worm and worm wheel in the recesses of the lower housing member, the upper housing member is placed on top and they are screwed together.

DE 41 04 470 C1 describes a car seat adjuster with a housing, in which a spindle nut and a threaded spindle are accommodated. The housing is a two-piece housing comprising a main housing element and a cover for closing the main housing element. A borehole is formed in a housing wall for receiving a drive shaft. The borehole extends laterally in a slot shape to an outside wall, which can be closed with the cover. The width of the slot corresponds to more than the width of the drive shaft and the width of the receiving section for the drive shaft in its respective functional position. Furthermore, the housing is very complex and comprises a plurality of individual wall and support elements.

DE 37 25 158 C2 relates to a power seat apparatus for an automotive vehicle, wherein a multi-piece housing with a worm and a worm wheel is shown. A plurality of different components are used for supporting the worm and worm wheel. DE 37 26 801 C2 relates to a worm gear with a housing, wherein the housing is divided by a partitioning plane that includes the driving axle and is disposed perpendicular to the driving axle, so that upon separation of the two housing members an opening is formed for inserting the worm wheel and worm. DE 35 19 058 C2 describes a seat adjustment for a motor vehicle seat with a complex housing for accommodating a worm and a worm wheel. A shaft is mounted in a U-shaped support, which is closed by a flat cover-shaped element in order to prevent the shaft from sliding out of the support. DE 29 25 032 C2 describes a drive unit for a seat adjustment with a multi-piece housing for accommodating a worm and a worm wheel. Particularly support elements, which are included in the housing parts as separate components, serve the support of shafts. DE 29 03 782 A1 relates to an adjustment mechanism with a complex design for receiving a worm and a worm wheel, wherein they are accommodated in special bearing elements.

SUMMARY

It is the object of the invention to simplify a gear for adjusting two elements that can be displaced in relation to each other, particularly vehicle elements of a seat adjustment device. In particular, the number of elements required is intended to be reduced and simpler assembly and/or replacement of gear elements are supposed to be possible.

This object is attained with a gear for adjusting two elements that can be displaced in relation to each other, with the characteristics of claim 1. The object of claim 10 is a spindle or worm drive mechanism with a gear of this type. The object of claim 11 is a vehicle seat with a gear of this type. Advantageous embodiments are disclosed in the dependent claims.

Advantageously, drive mechanisms identical in design are used for left and right seat rails if the worm used and/or the worm wheel used are configured axially on both sides for inserting or guiding through a drive shaft. It is preferred if the drive shaft is connected to the worm with a square socket, which is provided in the worm on both sides or through it.

Accordingly, it is preferred to use a gear for adjusting two elements that can be displaced in relation to each other, particularly vehicle elements of a seat adjustment device, a window lifter or a sliding roof, wherein the first one of the parts has a non-rotatable spindle or a fixed toothed rack and wherein the gear is configured with a worm wheel, which has a spindle nut non-rotatable thereto for driving the spindle or a worm non-rotatable thereto for driving the toothed rack, with a drivable worm for transmitting a driving force to the worm wheel and with a gear housing, which receives and supports the worm and the worm wheel and which can be connected non-displaceably to the second one of the parts in the displacement direction thereof, wherein the gear housing is made of a single-piece body with a worm bearing and a worm wheel bearing.

It is preferred to use a gear, wherein the worm bearing is formed in one or two opposite walls, particularly in the form of side walls of the gear housing, above all in the top section of the gear housing, and in the insertion direction of the worm comprises a worm bearing access opening, with the worm bearing access opening extending through the corresponding side wall to the bottom of the side wall and/or of the gear housing.

It is preferable to use such a gear in which the worm bearing access opening or a section in the transition region between the worm bearing access opening and the worm bearing has a smaller distance than the diameter of a worm shaft of the worm.

It is preferred to use a gear in which the worm wheel bearing is formed in one or two opposite walls, particularly beneath the upper worm, and comprises a worm wheel bearing access opening, with the worm wheel bearing access opening extending through a corresponding side wall to the bottom of the side wall and/or of the gear housing.

It is preferable to use such a gear in which the worm wheel bearing access opening or a section in the transition region between the worm wheel bearing access opening and the worm wheel bearing has a smaller distance than the diameter of a worm wheel shaft of the worm wheel.

It is preferable to use a gear in which the side walls with the worm bearing are configured between the side walls with the worm wheel bearing. In a simple embodiment, the side walls with the worm wheel bearing form the fronts of a housing and the side walls with the worm bearing form the two walls between the fronts. In a view from above, these four walls thus form side walls of a square or cuboid housing. Other embodiments, however, are also conceivable, for example one in which two of the opposite walls extend to the two other walls at an angle between a worm axis and a worm wheel axis, the angle theoretically ranging between 1 and 179°.

Preferred is a gear, in which the side walls in the bottom section of the gear housing are formed by mutually spaced legs, with the distances of two adjoining legs as worm bearing access openings for the purpose of guiding through a worm shaft and/or as worm wheel bearing access openings for guiding through a worm wheel shaft are dimensioned wide enough and/or elastic enough.

Preferable is such a gear that has a housing closure element for closing the bottom of the gear housing, the housing closure element fixing the legs against each other after inserting the housing closure element. A housing closure element of this type can be implemented particularly in the form of an encompassing pan or in the form of a pin design.

Preferable is a gear with a housing closure element for closing the bottom of the gear housing, in which the housing closure element supports the worm wheel and/or the worm in the gear housing from beneath.

Preferable is a gear, in which at least one inside side wall towards the worm bearing access opening or towards the worm wheel bearing access opening has an insertion taper.

This advantageously simplifies the design and assembly of such a gear accordingly. In the simplest case, this is done by reducing the number of components to three particular ones, namely a single-piece gear block as the gear housing, a worm and a spindle nut. The worm and spindle nut used can have the conventional designs, with the spindle nut having particularly an enveloping row of teeth with a cylindrical portion. The gear block may be produced easily and at the same time cost-efficiently, for example, as a polymer injection-molded part with accordingly integrally formed recesses for gearing elements. The individual components, meaning particularly the worm and spindle nut, are inserted in the gear block using appropriate receiving devices and/or feed devices to the bearings and are supported therein rotatably about the respective longitudinal axis using a snap-fit or detent connection. According to a preferred embodiment, a gear cover is snapped into corresponding detent elements from beneath as a housing closure element in order to secure the combination of worm wheel and spindle nut in the gear housing.

It is preferred if a gear with such very small dimensions is used between two seat rails, functioning as the elements of a vehicle seat that can be displaced relative to each other. In principle, however, the use in various applications of worm gears can be implemented.

One exemplary embodiment will be explained in more detail hereinafter with reference to the drawing, wherein:

DETAILED DESCRIPTION

Figure 1:
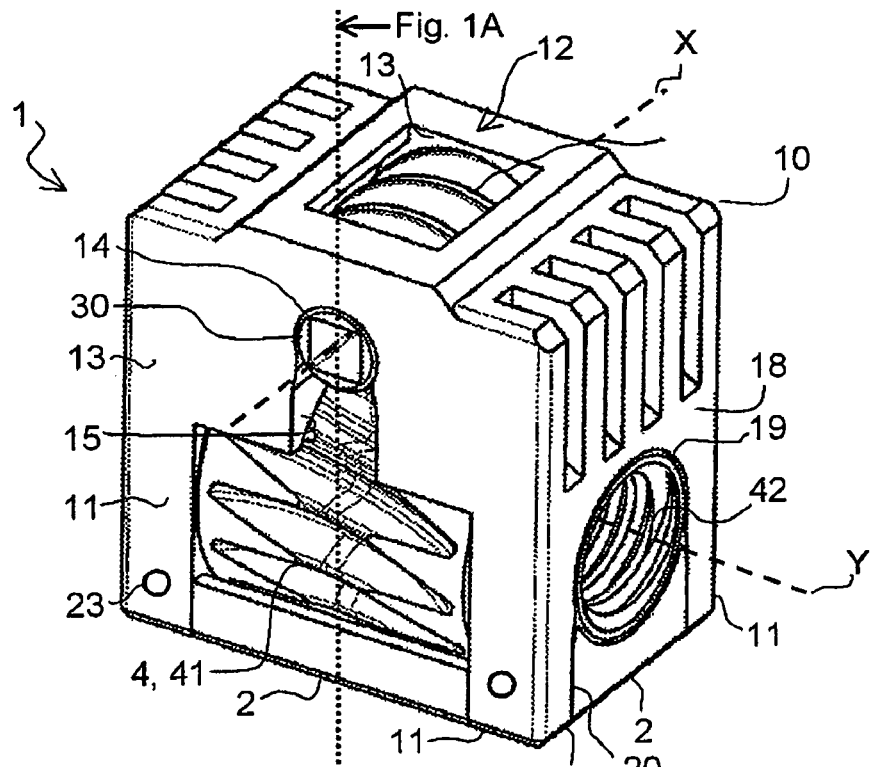
FIG. 1 is a gear housing with inserted worm and inserted worm wheel according to a particularly preferred embodiment.
Figure 2:
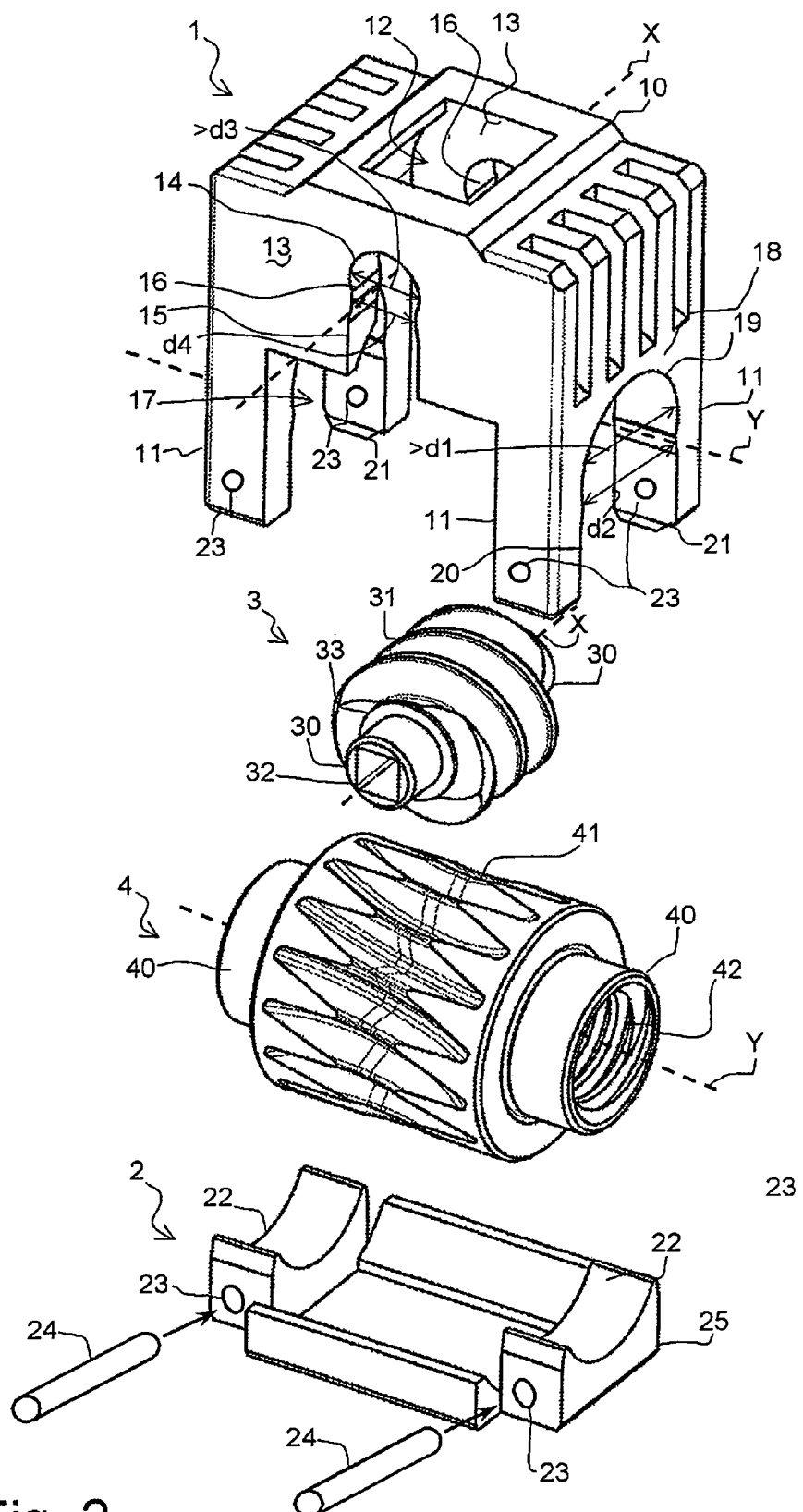
FIG. 2 shows the elements of the arrangement according to FIG. 1 in exploded view.

FIGS. 1 and 2 show assembled and exploded views of a gear and the components thereof according to a particularly preferred embodiment. A single-piece gear housing 1 serves to accommodate a worm 3 and a worm wheel 4. The arrangement can optionally be closed from beneath using a housing closure element 2 or a housing cover.

The gear housing 1 comprises an upper element 10, on the bottom corner regions of which legs 11 or bar-shaped extensions are integrally formed and directed downward. The spatial directions above and below in the present embodiment serve only illustration purposes since the assembled gear can ultimately be inserted in a drive mechanism in arbitrary spatial directions.

Figure 1A:
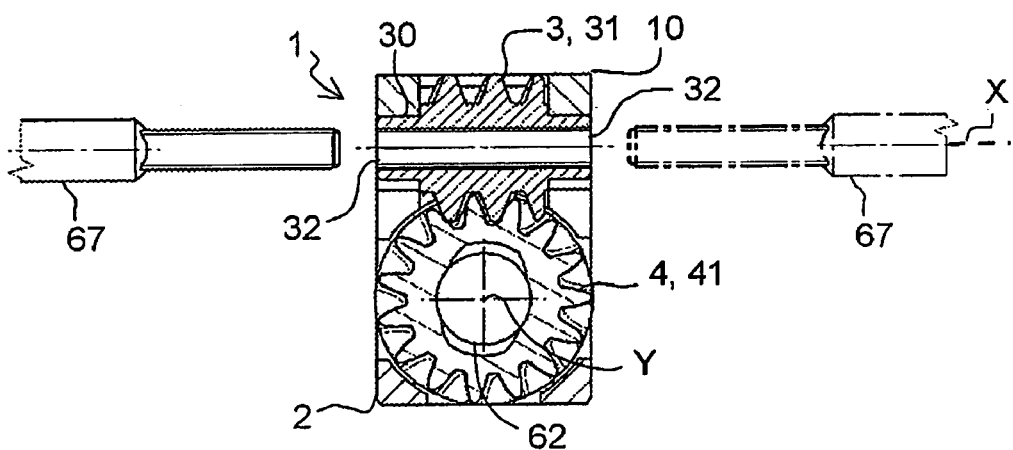
FIG. 1A is a sectional view of such an arrangement.

So as to support the worm 3, a receiving or worm space 12 is formed in the upper element 10 of the gear housing 1. As is known from prior art, the worm 3 comprises a worm shaft 30 and worm teeth 31, which are formed in the center region of the worm shaft 30 around the same. As is apparent particularly from FIG. 1A, both ends of the worm shaft 30 preferably have drive shaft mounts 32 serving the fastening of a drive shaft to the worm shaft 30, so that the worm 3 can be rotated about the longitudinal axis X thereof. An arrangement of this mount on both sides, or a through-arrangement of a drive shaft mount 32, allows the provision of drive mechanisms for left and right seat rails with identical designs. Using one and the same drive mechanism is useful in that a drive shaft 67 can be inserted axially on both sides or that it can extend through. It is preferable if the drive shaft mount 32 is configured in the worm 3 as a square socket on both sides or through it.

Before inserting the worm 3 in the worm space 12, it is preferable to place annular bearing disks 33 on the two worm shaft ends 30, which project from the worm 3 on both sides of the worm teeth 31. This, however, is not absolutely required and may be foregone in the event of an enveloping row of teeth with cylindrical portion, for example.

Worm bearings 14 are formed in two mutually opposed first side walls 13 of the upper part 1 [sic][1] of the gear housing 1, which part forms the worm space 12. At least one of the worm bearings 14 is configured as a through-bore through the corresponding first side wall 13 in order to allow the corresponding worm shaft 30 and/or the drive shaft attached thereto to pass through the first side wall 13. The open diameter of the worm bearing 14 is larger than the diameter d3 of the worm shaft 30. It is preferable if the design allows minimum clearance.

[1] Translator's note: Reference numeral should be 10

For inserting the worm 3 in the worm bearing 14, worm bearing access openings 15 are integrated in the first two side walls 13, which openings extend from the worm bearing 14 to the bottom of the upper element 10 or the corresponding first side walls 13. This allows the worm 3 to be inserted in the worm bearing 14 from beneath, wherein the ends of the worm shaft 30 are guided through the two corresponding worm bearing access openings 15.

So as to retain the worm 3 in the worm space 12, according to a simple embodiment the worm wheel 4 may be inserted in the gear housing 1 from beneath and be supported therein such that the worm 3 is securely supported in the worm bearing 14 and also supported towards the bottom by the worm wheel.

According to the preferred embodiment, however, the wall of the worm bearing access opening 15 has a transversely, meaning particularly parallel to the worm axis X, extending bar as a retaining bar 16. An open distance d4 between the retaining bar or bars 16 on the two opposite walls of the worm bearing access opening 15 is smaller than the diameter d3 of the worm shaft 30. The wall of the gear housing 1 in the region of at least the worm bearing access opening 15 and/or the wall of the worm shaft 30 are made of elastic material, which yields when inserting the worm 3 in the worm bearing 14 through the worm bearing access openings 15. After inserting the worm shaft 30 above the retaining bar or bars 16, the worm shaft 30 with the two ends thereof is rotatably supported in the worm bearing 14, wherein the retaining bars 16 prevent the shaft from sliding downward out of the worm bearing 14.

The worm wheel 4 comprises in the familiar fashion a worm wheel shaft 40, which protrudes from worm wheel teeth 41 with both ends. The worm wheel 4 is configured such that it can rotate about a worm wheel axis Y, wherein the worm wheel axis Y at the same time forms the axis of rotation of a spindle nut 42. The spindle nut 42 is formed by inside teeth of the worm wheel shaft 40, which is configured as a hollow shaft. The spindle nut 42 serves to accommodate a spindle, which during operation of the gear, for example in the guide rails of a vehicle seat, meshes with a spindle disposed non-rotatably in one of the rails. Upon rotating the worm wheel 4, the worm wheel 4 is displaced back and forth along the stationary spindle. Together with the worm wheel 4, the gear housing 1 accommodating the worm wheel 4 is displaced back and forth. The worm wheel 4 here is driven by a worm 3 provided on the top and a drive shaft, which is connected to the drive shaft mount 32 of the worm 3.

For inserting the worm wheel 4, the gear housing 1 comprises worm wheel spaces 17 beneath the upper element 10 and beneath the worm space 12. The worm wheel space 17 may be bordered by two or more mutually opposed closed walls or preferably by the four legs 11. Two mutually adjacent legs 11, respectively, thus form a second side wall 18. Each of these two mutually opposed second side walls 18 includes a worm wheel bearing 19. The diameter of this worm wheel bearing 19 is equal to or larger than the outside diameter d1 of the worm wheel shaft 40, so that the worm wheel shaft 40 is supported rotatably about the worm wheel axis Y in the two worm wheel bearings 19.

A worm wheel bearing access opening 20 is provided in the two second side walls 18 for inserting the worm wheel 4 in the worm wheel bearing 19. The worm wheel bearing access openings 20 extend from the two worm wheel bearings 19 to the bottom of the two second side walls 18 or to the bottom of the gear housing 1, so that the worm wheel 4 can be inserted from beneath with the worm wheel shaft 40 through the worm wheel bearing access opening 20 upwards into the worm wheel bearing 19.

So as to support the worm wheel 4 and/or the worm wheel shaft 40 downward in the worm wheel bearings 19, a distance d2 of the walls in the worm wheel bearing access openings 20 is preferably slightly smaller than the outside diameter of the worm wheel shaft 40. The wall material of the worm wheel bearing access openings 20 and/or the material of the worm wheel shafts 40 are elastic such that the worm wheel shaft 40 can be inserted in the worm wheel bearings 19 from beneath through the worm wheel bearing access openings 20 and is supported securely towards the bottom by the walls after reaching the worm wheel bearings 19. To facilitate the insertion of the worm wheel shaft 40 in the worm wheel bearing access openings 20, the openings have a wall tapered towards the bottom and the outside as insertion taper 21.

Additionally or alternatively, a housing cover in the form of a housing closure element 2 may be inserted in the gear housing 1 from beneath. The housing closure element 2 then closes off the worm wheel space 17, which is otherwise open towards the bottom. The upper wall of the housing closure element 2 is preferably rounded such that the worm wheel space 17 forms a sufficiently large space for the worm wheel teeth 41 and so that the two ends of the worm wheel shaft 40 are supported on correspondingly shaped bearing surfaces 22. So as to fix the housing closure element 2 in the gear housing 1, a prior art detent closure comprising, for example, corresponding detent elements may be provided on the legs 11 of the gear housing 1. It is particularly preferred, however, if bolt recesses 23 for accommodating fastening bolts 24 are provided, wherein the bolt recesses 23 in the form of through-bores extend through the legs 11 as well as a lateral wall 25 of the housing closure element 2. The width of the lateral walls 25 preferably corresponds to the distance d2 of the walls of the worm wheel bearing access openings 20 so that the worm wheel space 17 is sealed towards the second side walls 18 after the worm wheel 4 has been inserted. The worm wheel axis Y extends particularly in a direction perpendicular to the worm axis X, as is known from prior art.

According to an alternative embodiment, a worm wheel 4 with a worm wheel shaft 40 may also be used in place of a worm wheel 4 with integrated spindle nut 42, wherein then in addition to the worm wheel teeth 41 worm teeth are configured on the worm wheel shaft 40. The worm teeth then serve the meshing with the teeth of a toothed rack, which is disposed in a stationary manner, for example in a rail attached on the vehicle bottom, in order to displace the gear housing 1 back and forth along the toothed rack. In this case, the bottom of the gear housing 1 is open to the bottom in order to allow engagement of the toothed rack, wherein such a toothed rack may extend through the worm wheel bearing access openings 20. In particular, such a toothed rack may also serve as abutment for the worm wheel 4, so that the constriction of the distance of the legs 11 or the walls of the worm wheel bearing access openings 20 need not be smaller than the diameter d1 of the worm wheel shaft 40.

It is also possible to implement a plurality of further embodiments of the gear housing 1. The gear housing 1 may be formed, for example, by a substantially cuboid housing with an open floor wall and four worm bearing or worm wheel bearing access openings 15, 20 extending through the side walls from the floor wall, which openings are directed upward to the respective worm bearing 14 or worm wheel bearing 19.

Instead of using elastic wall materials, it is also conceivable to configure elastic transition regions, particularly at the height of the worm wheel bearings 19 and/or the worm bearings 14, in order to temporarily widen the downward extending lateral walls of the worm wheel bearing access openings 20 and/or of the worm bearing access openings 15 for pushing through the worm wheel shaft 40 and/or the worm shaft 30.

Plastic material is particularly preferred for the gear housing 1, the worm 3 and the worm wheel 4 because it allows simple manufacturing using an injection molding process. In principle, however, also other materials can be used, particularly metal, to produce such gears.

Figure 3:
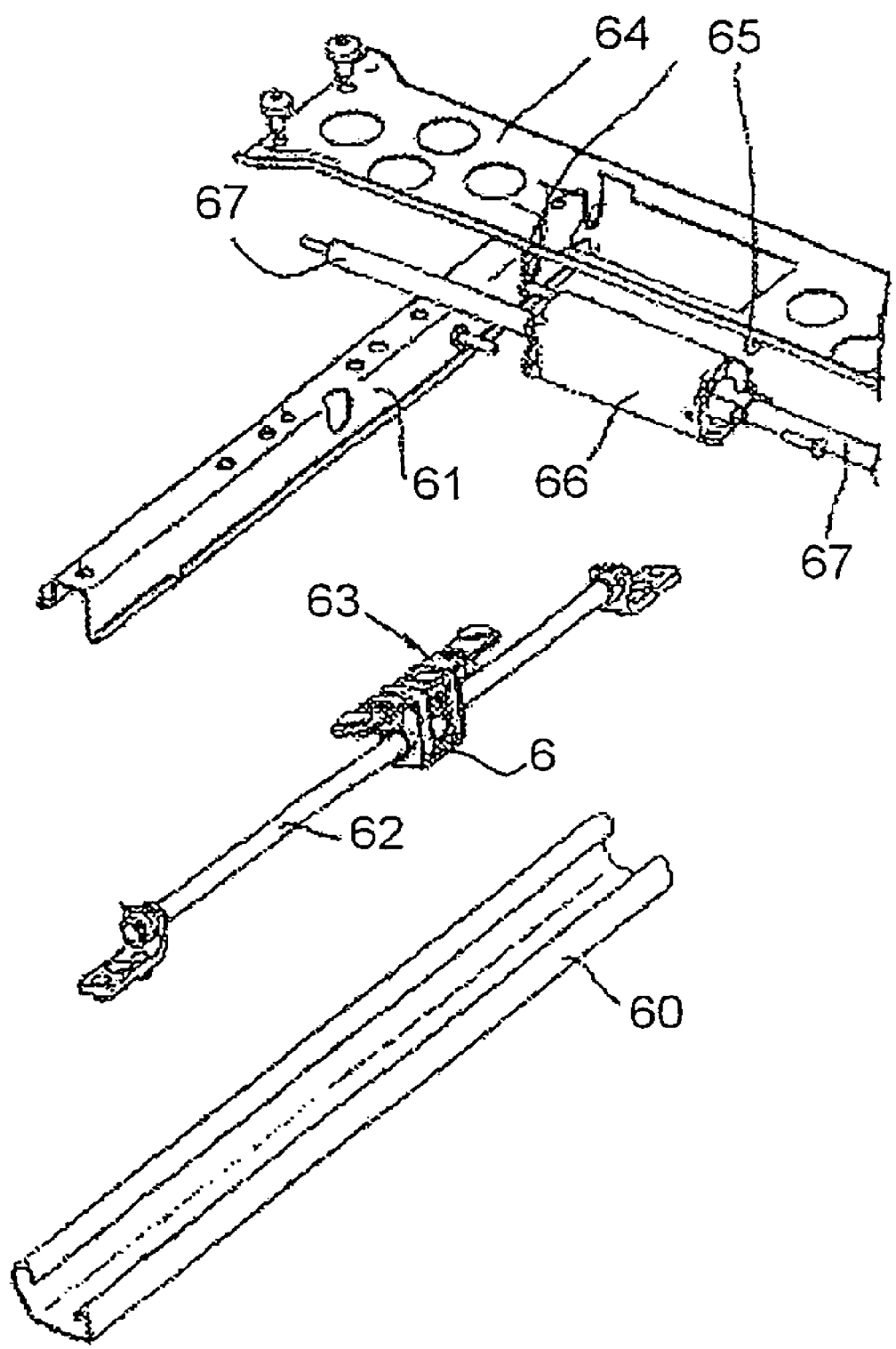
FIG. 3 is a schematic illustration of individual elements of a vehicle seat frame and rail guide with a gear according to the prior art.

A gear of this configuration comprising such a gear housing 1 with worm 3 and worm wheel 4 is used, for example, in an arrangement according to FIG. 3 in place of the gear 6 depicted there. The spindle 62 is guided through the spindle nut 42. The drive shaft 67 of the drive mechanism 66 is connected to the drive shaft mount 32 of the worm shaft 30 of the worm 3. Driving the drive shaft 67 by means of the drive mechanism 66 thus results in a rotation of the worm 3, which in turn results in a corresponding rotation of the worm wheel 4. As a result of the subsequent rotation of the spindle nut 42, the worm wheel 4, and via the support thereof in the worm wheel bearing 19 also the gear housing 1, are displaced back and forth along the stationary spindle 62. Together with the gear housing 1, the upper rail 61, which forms one of the adjustable elements, is displaced via the mount 63 in relation to the lower rail 60, which forms the other adjustable element, so that a seat attached to the upper rail 61 is displaced forward or backward relative to a vehicle bottom.

According to an alternative embodiment, the worm wheel 4 may also be disposed as an upper tooth element in the gear housing 1 above the worm 3.

Particularly with an arrangement of the worm wheel 4 as the lower tooth element in the gear housing 1 with the penetrating spindle 62, a support for the worm wheel shaft 40 that is closed toward the bottom may be eliminated if the spindle 62 retains the worm wheel 4, and via the worm wheel 4 optionally retains also the worm 3, relative to the gear housing 1 in the corresponding bearings 14, 19.

LIST OF REFERENCE NUMERALS

1 Gear Housing
10 Upper Element of 1
11 Legs/Bar-Shaped Extensions of 1
12 Worm Space
13 First Side Walls of 1
14 Worm Bearing
15 Worm Bearing Access Openings
16 Retaining Bar in 15
17 Worm Wheel Space
18 Second Side Walls of 1
19 Worm Wheel Bearing
20 Worm Wheel Bearing Access Openings
21 Insertion Taper of 20
2 Housing Closure Element/Cover
22 Bearing in 2 for 40
23 Bolt Recesses
24 Fastening Bolt
3 Worm
30 Worm Shaft
31 Worm Teeth
32 Drive Shaft Mount in 30
X Worm Axis
4 Worm Wheel
40 Worm Wheel Shaft
41 Worm Wheel Teeth
42 Spindle Nut
Y Worm Wheel Axis
d1 Diameter of 40
d2 Distance of opposite walls of the worm wheel bearing access openings 20
d3 Diameter of 30
d4 Distance of opposite walls of the worm bearing access openings 15

The invention claimed is:

1. A gear for adjusting two parts that can be displaced in relation to each other, particularly vehicle parts of a seat adjustment device, of a window lifter or a sliding roof, the first one of the parts comprising:

a non-rotatable spindle and the gear comprising a worm wheel, which has a spindle nut non-rotatable thereto for driving the spindle, a drivable worm for transmitting a driving force to the worm wheel, the worm having first and second opposing sides with each side having a square socket, and with the worm having a driveshaft running axially through the worm, and a single-piece elastic gear housing, which receives and supports the worm and the worm wheel and which can be connected non-displaceably to the second one of the parts in the displacement direction thereof, wherein the gear housing comprises a worm bearing and a worm wheel bearing, the worm bearing is configured in two opposite walls of the gear housing and comprises a worm bearing access opening and the worm wheel bearing is configured in two opposite walls of the gear housing and comprises a worm wheel bearing access opening, the gear housing is formed by a single-piece body with the worm bearing and the worm wheel bearing, first and second opposing drive shaft mounts are provided on the first and second sides of the worm in the axial direction with the first and second drive shaft mounts each configured to receive the drive shaft, and the worm bearing access opening or a section in the transition region between the worm bearing access opening and the worm bearing has a smaller distance (d4) than the diameter (d3) of a worm shaft of the worm and the worm wheel bearing access opening or a section in the transition region between the worm wheel bearing access opening and the worm wheel bearing has a smaller distance (d2) than the diameter (d1) of a worm wheel shaft of the worm wheel, wherein the single-piece elastic gear housing receives both the drivable worm and the worm wheel from beneath the single-piece elastic gear housing.

2. The gear according to claim 1, the worm bearing being configured in one or two opposite walls of the gear housing in the upper section of the gear housing, wherein the worm bearing access opening extends through the corresponding side wall to the bottom of the side wall and/or of the gear housing.

3. A gear according to claim 1, the worm wheel bearing being configured in one or two opposite walls beneath the upper worm, wherein the worm wheel bearing access opening extends through a corresponding side wall to the bottom of the side wall and/or of the gear housing.

4. A gear according to claim 1, wherein the side walls with the worm bearing are configured between the side walls with the worm wheel bearing.

5. A gear according to claim 1, the side walls in the bottom section of the gear housing being formed by mutually spaced legs, wherein the distances of two adjoining legs as worm bearing access openings for the purpose of guiding through a worm shaft and/or as worm wheel bearing access openings for guiding through a worm wheel shaft are dimensioned wide enough and/or elastic enough.

6. A gear according to claim 5, with a housing closure element for closing the bottom of the gear housing, wherein the housing closure element fixes the legs against each other after inserting the housing closure element.

7. A gear according to claim 1, with a housing closure element for closing the bottom of the gear housing, wherein the housing closure element supports the worm wheel and/or the worm in the gear housing from beneath.

8. A gear according to claim 1, wherein at least one inside side wall towards the worm bearing access opening and/or towards the worm wheel bearing access opening has an insertion taper.

9. A gear according to claim 1, wherein at least one drive shaft mount is configured to have the profile of a square socket in the worm.

10. A spindle or worm drive, comprising a gear according to claim 1.

11. A vehicle seat, comprising a gear according to claim 1.

12. A gear for adjusting two parts that can be displaced in relation to each other, particularly vehicle parts of a seat adjustment device, of a window lifter or a sliding roof, the first one of the parts comprising;

a non-rotatable spindle and the gear comprising a worm wheel, which has a spindle nut non-rotatable thereto for driving the spindle, a drivable worm for transmitting a driving force to the worm wheel, the worm having first and second opposing sides with each side having a square socket, and with the worm having a driveshaft running axially through the worm, and a single-piece elastic gear housing, which receives and supports the worm and the worm wheel and which can be connected non-displaceably to the second one of the parts in the displacement direction thereof, wherein the gear housing comprises a worm bearing and a worm wheel bearing, the worm bearing is configured in two opposite walls of the gear housing and comprises a worm bearing access opening or the worm wheel bearing is configured in two opposite walls of the gear housing and comprises a worm wheel bearing access opening, the gear housing is formed by a single-piece body with the worm bearing and the worm wheel bearing, first and second opposing drive shaft mounts are provided on the first and second sides of the worm in the axial direction with the first and second drive shaft mounts each configured to receive the drive shaft, and the worm wheel bearing access opening or a section in the transition region between the worm wheel bearing access opening and the worm wheel bearing has a smaller distance (d2) than the diameter (d1) of a worm wheel shaft of the worm wheel wherein the single-piece elastic gear housing receives both the drivable worm and the worm wheel from beneath the single-piece elastic gear housing.

13. A gear for adjusting two parts that can be displaced in relation to each other, particularly vehicle parts of a seat adjustment device, of a window lifter or a sliding roof, the first one of the parts comprising:

a non-rotatable spindle and the gear comprising a worm wheel, which has a spindle nut non-rotatable thereto for driving the spindle, a drivable worm for transmitting a driving force to the worm wheel, the worm having first and second opposing sides with each side having a square socket, and with the worm having a driveshaft running axially through the worm, and a single-piece elastic gear housing, which receives and supports the worm and the worm wheel and which can be connected non-displaceably to the second one of the parts in the displacement direction thereof, wherein the gear housing comprises a worm bearing and a worm wheel bearing, the worm bearing is configured in two opposite walls of the gear housing and comprises a worm bearing access opening or the worm wheel bearing is configured in two opposite walls of the gear housing and comprises a worm wheel bearing access opening, the gear housing is formed by a single-piece body with the worm bearing and the worm wheel bearing, first and second opposing drive shaft mounts are provided on the first and second sides of the worm in the axial direction with the first and second drive shaft mounts each configured to receive the drive shaft, and the worm bearing access opening or a section in the transition region between the worm bearing access opening and the worm bearing has a smaller distance ($d4$) than the diameter ($d3$) of a worm shaft of the worm wherein the single-piece elastic gear housing receives both the drivable worm and the worm wheel from beneath the single-piece elastic gear housing.

* * * * *